UNITED STATES PATENT OFFICE.

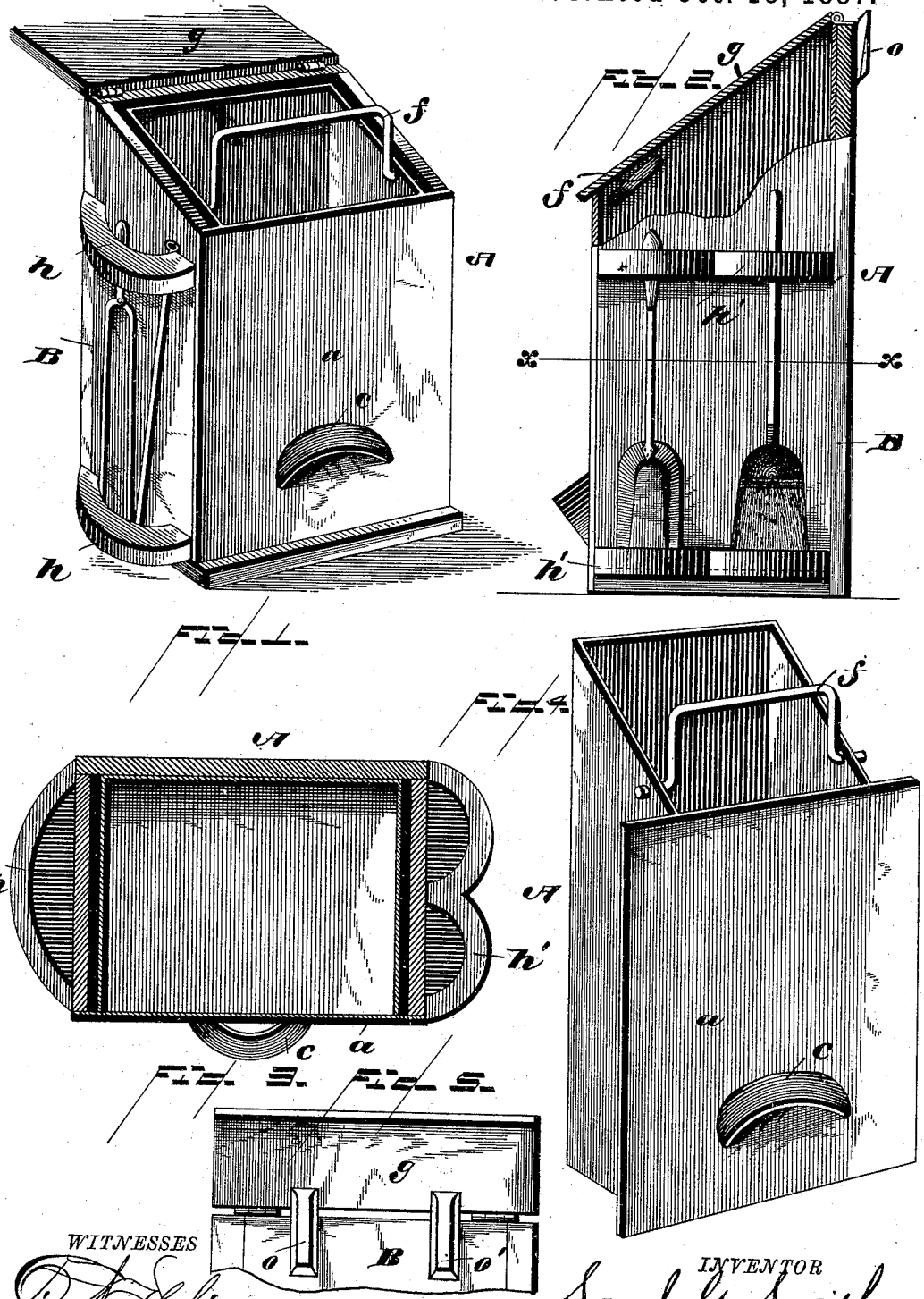

SARAH G. SMITH, OF CLEVELAND, OHIO.

FUEL-BOX.

SPECIFICATION forming part of Letters Patent No. 371,714, dated October 18, 1887.

Application filed July 5, 1887. Serial No. 243,406. (No model.)

*To all whom it may concern:*

Be it known that I, SARAH G. SMITH, a citizen of the United States, residing at Cleveland, in the county of Cuyahoga and State of Ohio, have invented certain new and useful Improvements in Fuel-Boxes; and I do declare the following to be a full, clear, and exact description of the invention, such as will enable others skilled in the art to which it appertains to make and use the same.

My invention relates to outfits for stoves and fire-places; and it consists in the novel construction of a coal-hod and a receptacle for the same, substantially as hereinafter described and claimed, and illustrated in the accompanying drawings, in which—

Figure 1 is a perspective view of the fuel-box with the cover thrown back. Fig. 2 is a side elevation having part broken away near the top to show the interior of the box. Fig. 3 is a cross-sectional view taken on the line *x x* of Fig. 2. Fig. 4 is a perspective view of the coal-hod. Fig. 5 is a view of the back of the box, showing the supporting stops of the cover in elevation.

The letter A of the drawings represents my coal-hod, which is preferably rectangular in shape, with a closed bottom and open top, the latter being inclined downward from rear to front, as shown.

The front wall of my hod is usually formed of a sheet of metal that is wider than the rear wall thereof, and which, when placed in the receptacle hereinafter mentioned, covers not only the front side of the hod itself, but also the front edges of the side walls of said receptacle, as shown on Fig. 1 of the drawings. The front wall is marked *a* on the drawings, and is provided with a lifting-handle, *c*, near its bottom.

The letter *f* represents a bail for the coal-hod, pivoted in the side walls, respectively, as shown on Figs. 1 and 4 of the drawings. The hod is operated by grasping the bail *f* with one hand and the handle *c* with the other.

The letter B represents my receptacle, which is also preferably rectangular in shape, with a closed bottom, open front, and oblique open top, as shown. It is also provided with a hinged cover, *g*, and side ears, *h* and *h'*, for holding a kit of fire-place utensils—such as a poker, shovel, tongs, and broom—in the manner represented on Figs. 1 and 2.

It will be observed that in practice the front side of the coal-hod serves for the front wall of the receptacle.

The letters *o o'* on Fig. 5 of the drawings represent stops arranged in the rear wall of the receptacle at its top for regulating the movement of the hinged cover thereof.

It is obvious that instead of making the front side of the coal-hod serve as the front wall of the receptacle, swinging, folding, or sliding doors may be made to serve that purpose, so that in any case the operator would not be compelled to lift the hod out of the top of the receptacle; but its removal could always be easily effected by sliding it forward.

The apparatus entire furnishes to housekeepers, either for kitchen or parlor use, a convenient, neat, and desirable fuel-box. It is also obvious that the side ears or loops may be omitted in some cases when it is not desirable to hold utensils such as pokers, shovels, &c.

I claim as my invention—

An open-front receptacle having a hinged cover, in combination with a removable coal-hod, the front wall of which is wider than its side.

In testimony whereof I affix my signature in presence of two witnesses.

SARAH G. SMITH.

Witnesses:
FRANK N. WILCOX,
J. G. SMITH.